(12) United States Patent
Martin

(10) Patent No.: US 7,117,859 B1
(45) Date of Patent: Oct. 10, 2006

(54) AIR BLEED VAPOR SYSTEM

(76) Inventor: Roy Martin, 11701 Akins Rd., North Royalton, OH (US) 44133

( * ) Notice: Subject to any disclaimer, the term of this patent is extended or adjusted under 35 U.S.C. 154(b) by 0 days.

(21) Appl. No.: 11/110,195

(22) Filed: Apr. 21, 2005

Related U.S. Application Data

(60) Provisional application No. 60/522,076, filed on Aug. 11, 2004.

(51) Int. Cl.
*F02M 33/00* (2006.01)

(52) U.S. Cl. ...................................... 123/572

(58) Field of Classification Search ........ 123/572–574, 123/557
See application file for complete search history.

(56) References Cited

U.S. PATENT DOCUMENTS

| | | | | |
|---|---|---|---|---|
| 3,762,385 | A * | 10/1973 | Hollnagel | 123/545 |
| 4,092,962 | A * | 6/1978 | Beaton et al. | 123/557 |
| 4,344,406 | A | 8/1982 | Minor et al. | |
| 4,355,623 | A | 10/1982 | Graham | |
| 4,374,508 | A | 2/1983 | Pena | |
| 4,441,477 | A * | 4/1984 | Holt | 123/557 |
| 4,699,113 | A | 10/1987 | Chen | |
| 4,703,741 | A * | 11/1987 | Curran et al. | 123/557 |
| 5,027,783 | A * | 7/1991 | von Riesen | 123/572 |
| 5,159,915 | A * | 11/1992 | Saito et al. | 123/557 |
| 5,673,674 | A | 10/1997 | Monteiro Vieira | |
| 5,992,397 | A * | 11/1999 | Hideaki et al. | 123/538 |
| 6,502,562 | B1 * | 1/2003 | Manalo | 123/536 |
| 6,701,964 | B1 | 3/2004 | Maurice | |
| 6,837,213 | B1 | 1/2005 | Burnett | |

* cited by examiner

*Primary Examiner*—Marguerite McMahon
(74) *Attorney, Agent, or Firm*—John D. Gugliotta

(57) ABSTRACT

An air bleed vapor system is provided having a primary vapor manifold connected to a fuel line take-off for providing a source of liquid fuel to the system. A vapor control module incorporates a precision needle valve for allowing metering of extremely small flowrates of liquid fuel into the vapor manifold. A pressure line is inserted into the PCV intake of a vehicle, and a secondary vaporization chamber is in fluid communication with the pressure line and the vapor control module, and provides an oxygen intake chamber into which an air-fuel mixture can be held at the pressure of the vehicle's crankcase ventilation system. Finally, a delivery vaporization conduit in the form of a linearly elongated chamber is in fluid communication with the PCV manifold of the vehicle.

7 Claims, 3 Drawing Sheets

AIR BLEED VAPOR SYSTEM

RELATED APPLICATIONS

The present invention claims the benefit under 35 U.S.C. §119 of U.S. Provisional Patent No. 60/522,076 filed on Aug. 11, 2004.

BACKGROUND OF THE INVENTION

1. Field of the Invention

The present invention relates generally to intake systems for gasoline powered internal combustion engines and, more particularly, to an air bleed vapor system for atomizing such a vehicles positive crankcase ventilation (PCV) system.

2. Description of the Related Art

As is well known in the art, there are a number of devices available for assisting a vehicle owner in increasing fuel mileage. One category of such devices includes those that create increased turbulence within the intake, or exhaust, system of the vehicle's engine. Such devices appear to be targeted at creating a 'vortex' with the intent of generating more thorough air-fuel mixtures and, by extension, a more complete combustion. A second category utilizes magnetic fields in order to 'ionize' either fuel, the air, or the mixture, also in an attempt to urge a more complete combustion. And, a final category attempts to remove sludge and other impurities from the system, either by entrainment of such impurities in the lubrication system or through capture of blow-by in the PCV system.

A search of the prior art did not disclose any patents that read directly on the claims of the instant invention; however, the following references were considered related.

U.S. Pat. No. 6,837,213, issued in the name of Burnett, discloses a power booster fuel saver of the vortex-air-intake type.

U.S. Pat. No. 6,701,964, issued in the name of Maurice, describes a vortex generating airfoil fuel saver describing an airfoil shaped body.

U.S. Pat. No. 5,673,674, issued in the name of Monteiro Vieira, discloses a device for passing the fuel line through a multidirectional magnetic field.

U.S. Pat. No. 4,699,113, issued in the name of Chen, discloses an air-rich fuel saver which provides a fuel rich airstream into a vehicle's carburetor.

U.S. Pat. No. 4,374,508, issued in the name of Pena, discloses a fuel saver system for internal combustion engines which saturates the air portion of the air-fuel mixture with ether, alcohol or water.

U.S. Pat. No. 4,355,623, issued in the name of Graham, discloses an air inlet fuel saver device for internal combustion engines that provides an aeration nozzle directing air into the throat of the carburetor.

U.S. Pat. No. 4,344,406, issued in the name of Minor et al, describes a device that regulates the vacuum provided to the engine's intake manifold.

Consequently, a need has been felt for providing an apparatus and method of allowing for more efficient fuel-air mixtures to be created for increasing gas mileage in internal combustion engines.

SUMMARY OF THE INVENTION

It is therefore an object of the present invention to provide an improved air bleed vapor system.

It is a feature of the present invention to provide an improved air bleed vapor system that atomizes a vehicles positive crankcase ventilation (PCV) system.

Briefly described according to one embodiment of the present invention, an air bleed vapor system is provided having a primary vapor manifold connected to a fuel line take-off for providing a source of liquid fuel to the system. A vapor control module incorporates a precision needle valve for allowing metering of extremely small flowrates of liquid fuel into the vapor manifold. A pressure line is inserted into the PCV intake of a vehicle, and a secondary vaporization chamber is in fluid communication with the pressure line and the vapor control module, and provides an oxygen intake chamber into which an air-fuel mixture can be held at the pressure of the vehicle's crankcase ventilation system. Finally, a delivery vaporization conduit in the form of a linearly elongated chamber is in fluid communication with the PCV manifold of the vehicle.

In accordance with a preferred embodiment, fuel can be metered with air at the primary vaporization manifold through control of the precision needle valve. The fuel is drawn in by the flow of air through the vehicle's PCV system. The air-fuel mixture is delivered along the delivery vaporization conduit such as to allow sufficient time, distant, and thermal transfer to fully vaporize any fuel delivered into the systems such that the air entering the vehicle's PCV manifold contains a quantity of completely vaporized fuel.

An advantage of the present invention is that the delivery of a fuel rich air mixture into the PCV system is shown in improve the rate of fuel consumption in the engine.

Another advantage of the present invention is that the secondary vaporization chamber functions as an expansion chamber and provides a fuel rich air mixture upon the engine's initial starting.

Further, a preferred embodiment of the present invention has a locking means for preventing tampering with the precision needle valve after the desired settings are attained.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
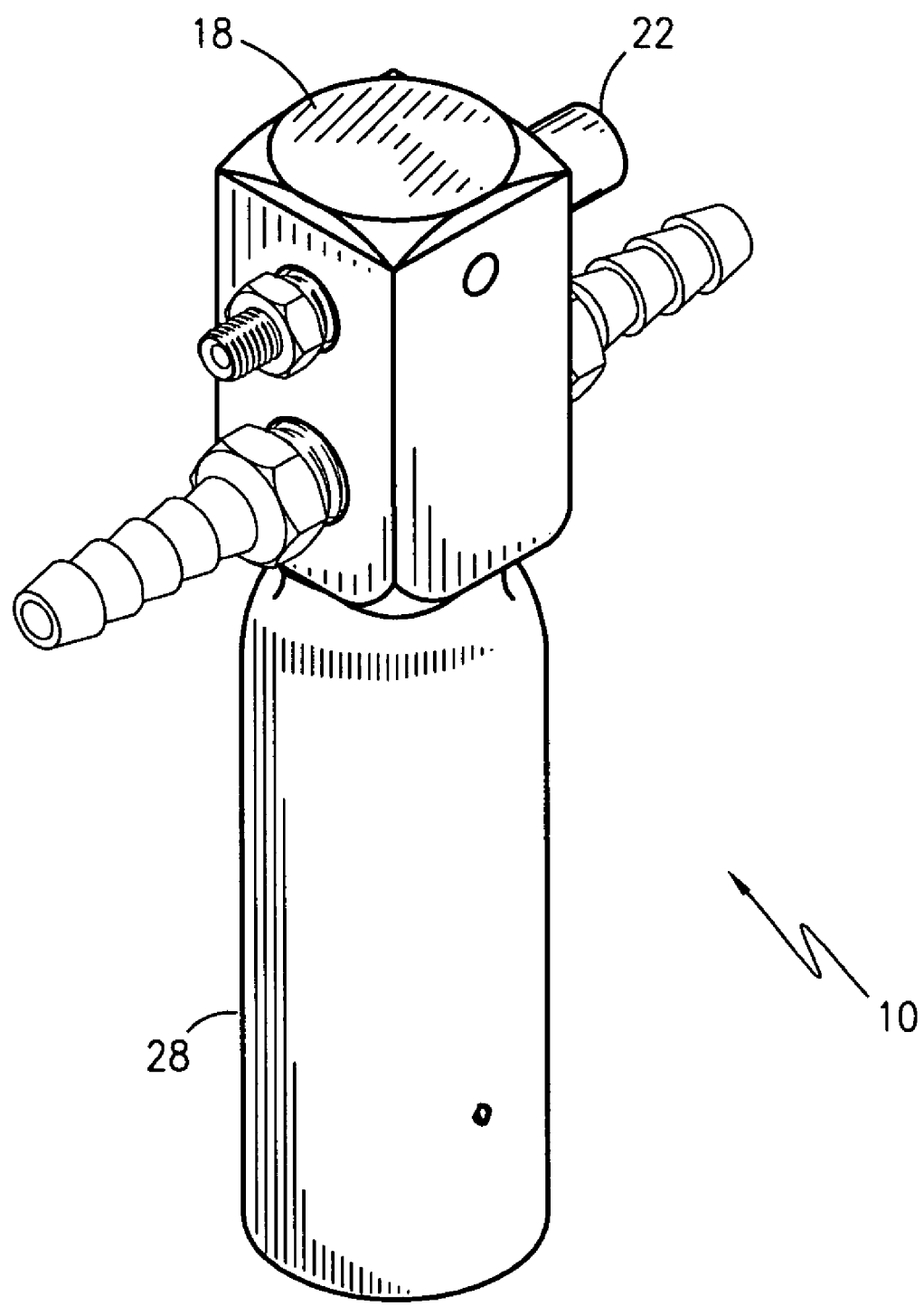
FIG. 1 is a perspective view of an air bleed vapor system according to the preferred embodiment of the present invention.
Figure 2:
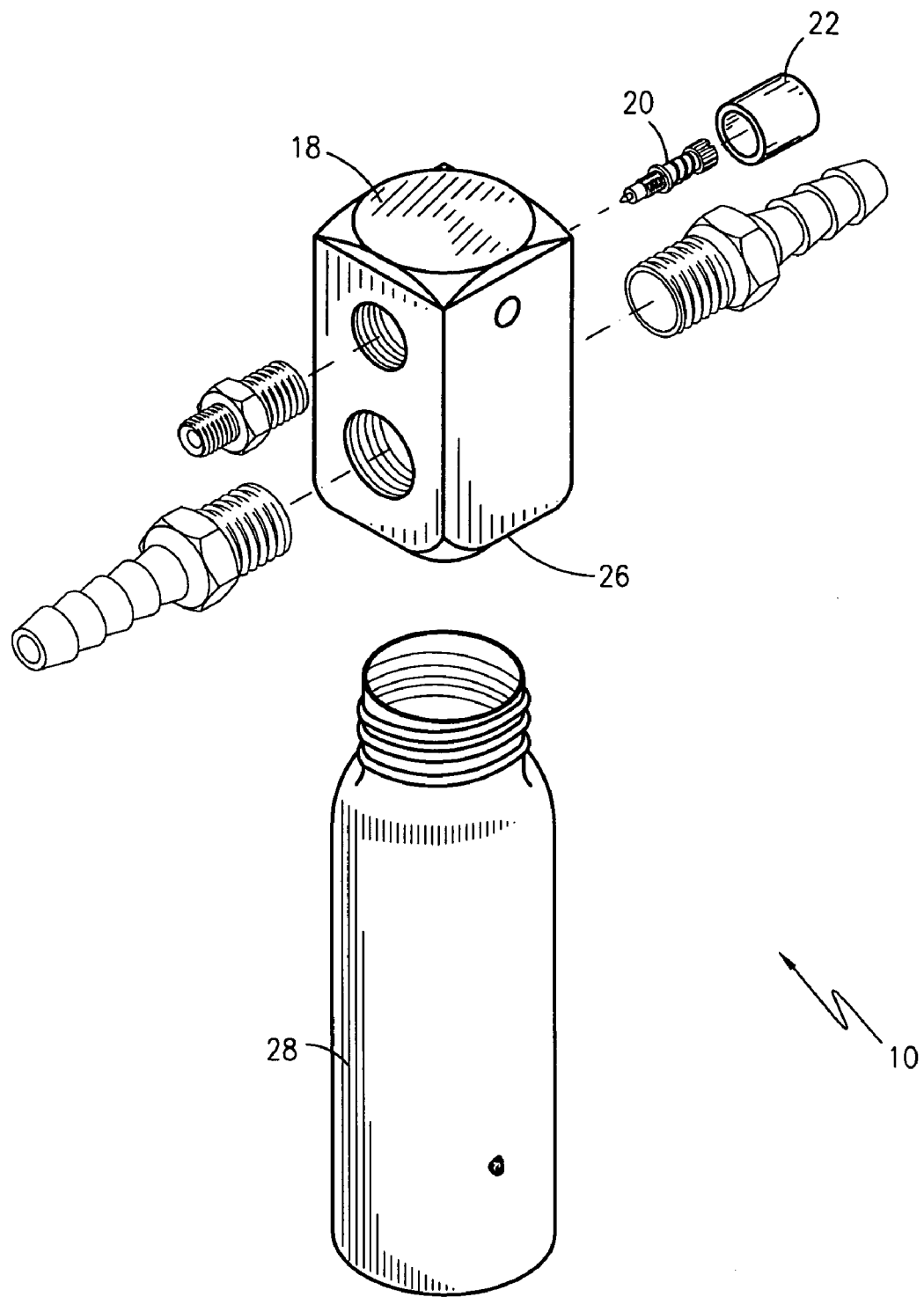
FIG. 2 is a partially exploded view thereof.
Figure 3:
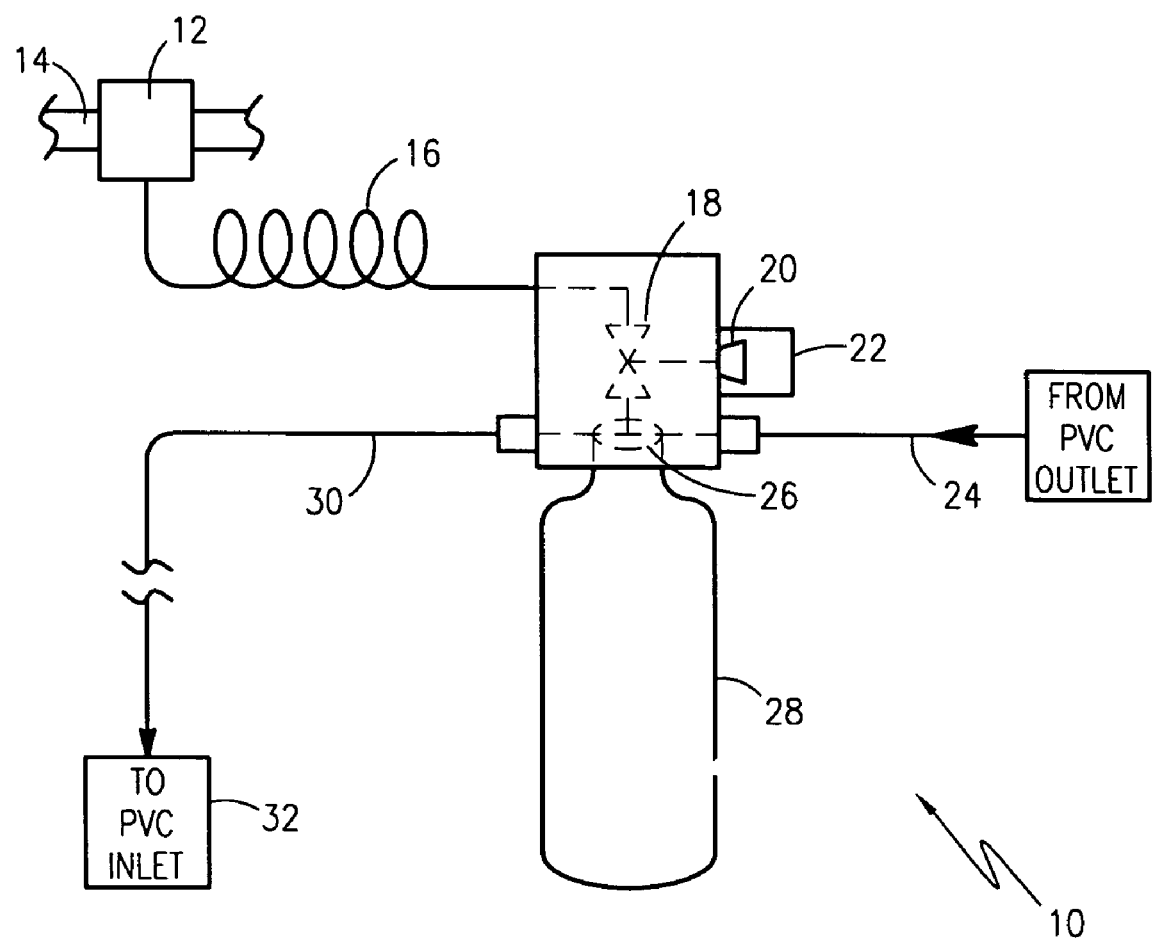
FIG. 3 is a schematic of the pneumatic flows of the system described in FIGS. 1–2.

The best mode for carrying out the invention is presented in terms of its preferred embodiment, herein depicted within the Figures 1. Detailed Description of the Figures Referring now to FIGS. 1–3, an air bleed vapor system 10 is provided having a gasoline supply module 12 inserted into a fuel line 14 of a vehicle and transporting the fuel through a series of fuel delivery coils 16 to a primary vapor manifold 18. The vapor control manifold 18 incorporates a precision needle valve 20 for allowing metering of extremely small flowrates of liquid fuel into the vapor control manifold 18.

A locking means 22, shown as a tamper resistant cap, prevents tampering with the precision needle valve 20 after the desired settings are attained. A PCV inlet line 24 from the PCV outlet of a vehicle is in fluid communication with the vapor control module and forms a primary vaporizer manifold 26. A secondary vaporization chamber 28 is in fluid communication with the primary vaporization manifold 26, and provides an oxygen intake chamber into which an air-fuel mixture can be held at a pressure of the vehicle's crankcase ventilation system. Finally, a delivery vaporization conduit 30 in the form of a linearly elongated chamber is in fluid communication with the PCV manifold inlet 32 of the vehicle. This functions essentially as a tertiary vaporization element. It has been found that the overall length of the vaporization conduit 30 should be of approximately more than 36 inches, and between approximately 60 inches in length in order for the air-fuel mixture delivered along the delivery vaporization conduit to have sufficient time, distant, and thermal transfer to fully vaporize any fuel delivered into the system such that the air entering the vehicle's PCV manifold contains a quantity of completely vaporized fuel. It is felt that a length of any less than 36 inches does not allow for this, and lengths in excess of 60 inches provides no additional meaningful results.

2. Operation of the Preferred Embodiment

In operation, the present invention is connected between the vehicle's PCV outlet and PCV inlet, and the gasoline supply module tapped into the fuel line. With adjustment of the precision needle valve, fuel can be metered with air at the primary vaporization manifold through control of the precision needle valve. The fuel is drawn in by the flow of air through the vehicle's PCV system. The air-fuel mixture is delivered along the delivery vaporization conduit such as to allow sufficient time, distant, and thermal transfer to fully vaporize any fuel delivered into the systems such that the air entering the vehicle's PCV manifold contains a quantity of completely vaporized fuel. The delivery of a fuel rich air mixture into the PCV system is shown in improve the rate of fuel consumption in the engine. Further, the secondary vaporization chamber functions as an expansion chamber and provides a fuel rich air mixture upon the engine's initial starting.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An air bleed vapor system for use with a vehicles positive crankcase ventilation (PCV) system comprising:
    a primary vaporization manifold for mixing air and fuel;
    fuel supply means for delivering liquid fuel to said primary vaporization manifold;
    air supply means for delivering pressurized air from a vehicle's PCV system to said primary vaporization manifold; and
    air-fuel delivery means for delivering said mixed air and fuel from said primary vaporization manifold to a vehicle's PCV system;
wherein said delivered mixed air and fuel has sufficient time, distance, and thermal transfer to fully vaporize any fuel delivered into the system such that the air entering the vehicle's PCV manifold contains a quantity of completely vaporized fuel; and
    a secondary vaporization chamber in fluid communication with said primary vaporization manifold for providing an oxygen intake chamber into which an air-fuel mixture can be held at a pressure of the vehicle's crankcase ventilation system.

2. The air bleed vapor system of claim 1, wherein said air-fuel delivery means comprises a delivery vaporization conduit in the form of a linearly elongated chamber is in fluid communication with the PCV manifold inlet of the vehicle.

3. The air bleed vapor system of claim 2, wherein said delivery vaporization conduit has an overall length of more than 36 inches in length.

4. The air bleed vapor system of claim 3, wherein said delivery vaporization conduit has an overall length of less than 60 inches in length.

5. The air bleed vapor system of claim 1, wherein said fuel supply means comprises:
    a gasoline supply module inserted into a fuel line of a vehicle, and
    a series of fuel delivery coils for transporting the fuel to said primary vaporization manifold.

6. The air bleed vapor system of claim 1, wherein said primary vaporization manifold further comprises a precision needle valve for allowing metering of extremely small flowrates of liquid fuel.

7. The air bleed vapor system of claim 6, wherein said primary vaporization manifold further comprises locking means for preventing tampering with said precision needle valve after a desired setting is attained.

* * * * *